Dec. 14, 1965 W. H. STOUT 3,223,461
AMBULATORY IRRIGATION SYSTEM
Original Filed March 11, 1963 2 Sheets-Sheet 1
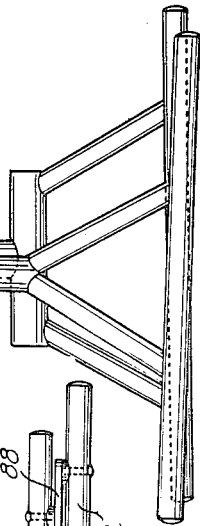
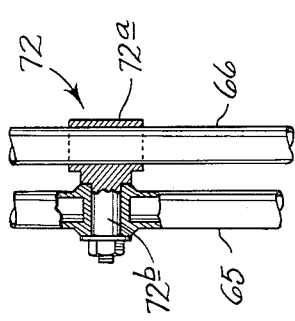
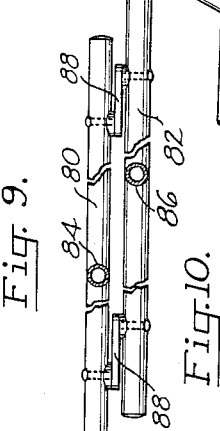
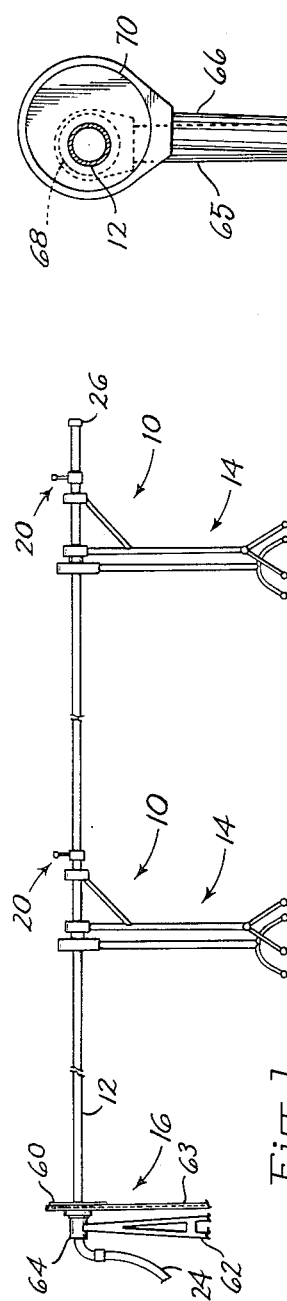
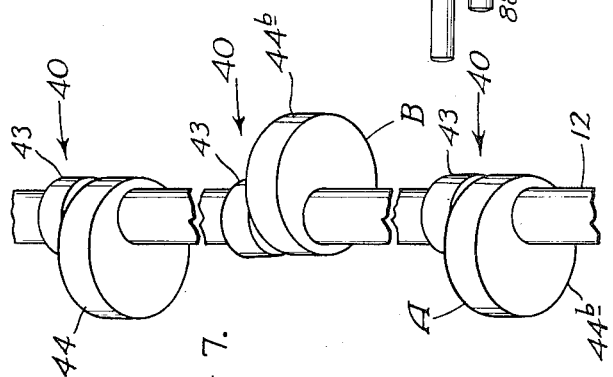
William H. Stout
INVENTOR.
BY
Attys.

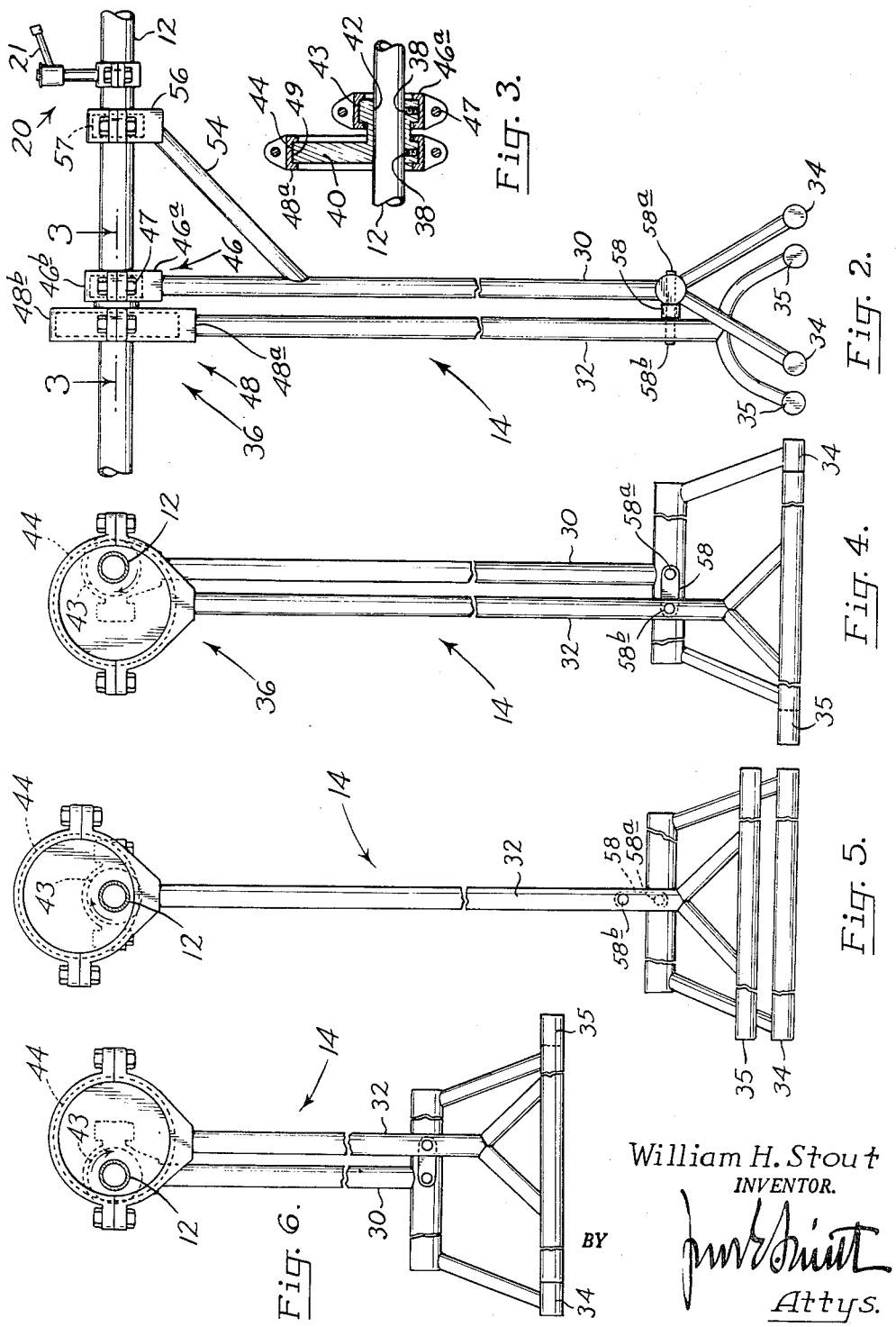

United States Patent Office 3,223,461
Patented Dec. 14, 1965

3,223,461
AMBULATORY IRRIGATION SYSTEM
William H. Stout, 223 N. Jessup St., Portland, Oreg.
Continuation of application Ser. No. 264,159, Mar. 11, 1963. This application Jan. 19, 1965, Ser. No. 427,217
16 Claims. (Cl. 305—2)

This invention relates to irrigation systems, and more particularly to irrigation systems including an elevated pipe or conduit which carries the water distributed by the system, and which is moved over the ground for the purpose of irrigating different areas of land. Such irrigation systems are commonly used in the irrigating of crops such as potatoes, beans, corn, etc., where the crops have some height, and where, because of the height of the crops, outlets for water positioned near ground level are ineffective to distribute water properly over the area to be irrigated.

This application is a continuation of applicant's prior application Serial No. 264,159, filed March 11, 1963, now abandoned.

A general object of this invention is to provide such an irrigation system, which features novel ambulatory mechanism or means supporting the conduit above the ground, such means when actuated producing a walking action which shifts the elevated pipe or conduit.

Another general object is to provide such an irrigation system, where the ambulatory means supporting the irrigation line or conduit is actuated to produce a walking action therein by movement, more specifically rotation, of the conduit.

Irrigation apparatus or systems comprising an elevated irrigation pipe provided with nozzles for the dispensing of water therefrom have in the past been provided with some form of wheel support accommodating lateral movement of the pipe. Such apparatus has performed adequately under certain circumstances, but most have been subject to certain disadvantages detracting from the overall serviceability thereof. Perhaps the simplest way of supporting a pipe above the ground with wheels is to mount the wheels on pipe with the pipe passing through the centers thereof, so that the pipe may function as an axle and when the pipe is rotated the wheels move and the entire apparatus shifts laterally. This requires wheels of excessively large diameter, however, where it is desired to elevate the pipe a substantial distance from the ground. An elevation of six feet for the pipe, for instance, requires wheels twelve feet in diameter. Large wheels are massive and expensive, and coupled with this disadvantage is the fact that with large diameter wheels relatively large torques must be applied to the pipe in order to rotate the wheels when it is desired to shift the pipe. This will be readily understood when it is remembered that with wheels twelve feet in diameter, one revolution of the pipe must produce enough force in the wheels to shift the pipe laterally a distance of about 37½ feet. The usual irrigation pipe is made of aluminum or like material, and where the pipe is subjected to high torques, bending of the pipe occurs.

Another disadvantage of conventional apparatus, as described above, is the fact that after the irrigation pipe has been rotated to produce lateral shifting thereof, difficulties are involved in bringing the nozzles which distribute the water into proper alignment in a position directly over the pipe, with the pipe at rest in its new position. Such nozzles usually are secured to the pipe in an aligned position therealong, the nozzles being swung in circular arcs when the pipe is rotated. Should any twisting occur in the pipe, a condition is reached where some of the nozzles may end up in positions extending straight up into the air (as they should be), while others extend out to either side of the proper vertical position. This obviously is disadvantageous, since with nozzles extending at all angles from the pipe distribution of water from the pipe will not occur evenly over a wide area. The problem is particularly acute when it is remembered that an irrigation pipe may have considerable length, pipes having lengths of a quarter of a mile or so not being uncommon.

Another object of the invention, therefore, is to provide an irrigation system, including an elevated pipe, which features walking structures actuated by rotation of the pipe to move the pipe, and is constructed in such a manner that after the pipe is shifted into a new position, nozzles on the pipe which originally were aligned tend again to assume their original aligned position.

A further object is to provide an irrigation system, including an elevated pipe supported by walking structures, where a mechanical advantage is introduced into the mechanism, whereby the total lateral distance that the pipe moves when the same is rotated is only a portion of the distance that it would have moved were the pipe supported by wheels with the pipe serving as an axle for the wheels.

A further object of the invention is to provide an elevated-type irrigation system, featuring walking structures for supporting the water-carrying conduit or pipe in the system, where said walking structures include legs moved up and down and laterally of each other, such movement being the result of novel structure in the system actuated by rotation of the pipe.

With the apparatus of the invention, because of the substantially smaller torques involved when the pipe is rotated, the pipe may be rotated by drive means connected to middle portions of the pipe. This is particularly advantageous in irrigating fields where a road parallels the fields to be irrigated, since the drive means may be supported on a tractor moved along the road.

Other objects and advantages of the invention will become more apparent from the following description, which is to be read in conjunction with the accompanying drawings, wherein:

FIG. 1 is a side elevation of portions of irrigation apparatus constructed according to one embodiment of the invention, such apparatus including an elongated, elevated pipe or conduit through which water is carried, and walking structures spaced at intervals along the length of such pipe, which are actuated by rotation of the pipe to shift the same laterally;

FIG. 2 is an enlarged, side view of one of the walking structures illustrated in FIG. 1;

FIG. 3 is a cross-sectional view, taken generally along the line 3—3 in FIG. 2;

FIGS. 4, 5 and 6 are end views of the walking structure illustrated in FIG. 2, and showing the same with the parts thereof in different positions;

FIG. 7 is a perspective view of portions of the conduit in the apparatus, showing the relative positions of various journal portions provided in the apparatus for the purpose of actuating the walking constructions (such walking structures having been removed);

FIGS. 8 and 9 illustrate a modified form of walking structure; and

FIG. 10 is a view of a set of ground-contacting bars, or feet, interconnected by a pair of crank members according to a still further modification of the invention.

Referring now to the drawings, and first of all to FIG. 1, here irrigation apparatus is indicated generally at 10, comprising an elongated elevated conduit or pipe 12, and plural walking structures 14 spaced at intervals along the length of the conduit and providing ambulatory support for the conduit. At the left of the drawing, a power-operated drive means 16 is shown, which is operable to move the pipe by rotating it, with such rotation producing actuation of the walking structures, and shifting of conduit or pipe 12 in a lateral direction.

The apparatus shown in FIG. 1 has been shortened, by the removal of portions of conduit 12 intermediate the ends thereof. While only part of the apparatus is shown, it should be understood that the apparatus frequently may have considerable length to enable it to extend across an entire field. While irrigating a field, the apparatus stands in a stationary position for an irrigating period that may be as long as several hours. After this irrigating period, the supply of water to the conduit is cut off, and the conduit moved laterally and over the field to place it in a new irrigating position. The supply of water is then turned on, and the apparatus remains stationary for another irirgating period. This cycle of operation is repeated until the entire field has been irrigated.

Mounted in a position fixed on conduit 12, and spaced along the length thereof, are nozzles or outlets 20 that extend upwardly from conduit 12 with the conduit properly positioned to irrigate. With the device operating, irrigation water flows through conduit 12 and thence out the nozzles. The nozzles with the apparatus in an irrigating position are all substantially vertical, i.e., are substantially in alignment. In this way, and assuming the nozzles have similar constructions, the areas of land watered by the nozzles are uniform. The nozzles are conventional in construction, and include the usual sprinkler mechanism 21 (see FIG. 2) mounted at the top thereof. With the construction described, during an irrigating period a stretch of land extending along the entire length of the conduit may be watered all at one time.

Water is supplied to conduit 12 through a hose 24 connecting through a rotatable coupling with one end of the conduit. The other end of the conduit is closed, as by a cap 26.

Describing now one of the walking structures 14, and with reference in particular to FIGS. 2 through 6, each walking structure comprises a part of upright legs or standards 30, 32. At the base of each leg or standard are elongated ground-contacting members or bars also referred to as "feet," indicated at 34 for leg 30 and at 35 for leg 32. The bars extend normally of conduit 12 and provide lateral stability for the conduit. In the embodiment illustrated, two such bars are attached to the base of each standard or leg, which are laterally spaced from each other, and which provide longitudinal stability for the conduit.

Upper portions of the legs or standards are mounted on conduit 12 by mechanism indicated generally at 36 which is actuated by rotation of conduit 12 to produce up-and-down movement of first one and then the other of the standards, coupled with relative movement of the bottoms of the standards in a direction extending laterally of the conduit.

More specifically, fastened to pipe 12 by screws 38 is a part 40, having a bore 42 extending therethrough. Bore 42 receives the pipe, which may extend as a continuous piece through part 40. Part 40 includes a first cylindrical mounting portion 43, also referred to herein as a journal portion, the axis of which coincides with the longitudinal axis of pipe 12, i.e., which is concentric with the pipe. Part 40 also includes a second cylindrical mounting portion or journal portion 44, the axis of which is radially offset from the axis of the pipe, i.e., which occupies an eccentric position with respect to the pipe and journal portion 42.

Each of the legs or standards includes a bearing portion joined thereto adjacent the top end thereof, which is journaled on one of the aforementioned journal portions. Thus, leg 30 includes bearing portion 46, comprising semicylindrical halves 46a, 46b fastened together by nut and bolt assemblies 47, journaled on journal portion 42. Leg 32 includes a similar bearing portion 48, comprising halves 48a, 48b fastened toegther, and journaled on journal portion 44. The bearing portions have annular channels extending circumferentially about their interiors, such as channel 49 shown for bearing portion 48, which fit snugly about the journal portions described with the bearing portions held from movement in an axial direction off the journal portions.

To provide further rigidity in the structure, a brace such as brace 54 may be included, extending from the leg which is journaled on the concentric journal portion (leg 30) to conduit 12. The brace is shown as fixed at one end to the leg, and journaled by means of bearing 56 on a journal 57 secured to the conduit at a point spaced axially from part 40.

As will hereinafter become apparent, when the pipe is rotated first one and then the other leg is lifted off of and then returned to the ground. This lifting of a leg is accompanied with shifting of the leg in a direction extending laterally of the pipe, so that when the same is returned to the ground, it contacts the ground at a point spaced ahead of the point from where the leg left the ground. Accommodating this movement of the legs, and mounted adjacent the base of the legs, is a crank member 58, with offset ends 58a, 58b journaled in the two legs. The crank member is provided for the purpose of restricting the movement at the bottom of the legs to movement which is substantially the same as the movement occurring in the tops of the legs. In the embodiment illustrated, the legs remain parallel to each other at all times.

Completing the description of the apparatus illustrated, and referring again to FIG. 1, drive means 16 comprises a sprocket 60 fastened to pipe 12 adjacent one of its ends. Supporting the end of the conduit adjacent the sprocket is a support 62 with a sleeve 64 adjacent the upper end thereof within which the pipe is journaled. Trained over sprocket 60 is a drive chain 63. The support, and motor for moving chain 63, may be mounted on a tractor (not shown), or similar piece of equipment, which is moved over the ground when shifting the apparatus into a new irrigating position.

Explaining now the operation of the apparatus disclosed, during a sprinkling period the legs of the various walking structures are as illustrated in FIGS. 1 and 2, i.e., positioned with the ground-contacting members at the base thereof flat on the ground. The pipe has a position like the one shown in FIG. 1, wherein the nozzles secured to the pipe all project substantially upwardly.

After a sprinkling period, and when it is desired to shift the conduit to a new location, the water supply is shut off, and pipe 12 is rotated, which is accompanied with rotation of parts 40 for the various walking structures. The legs of each walking structure are then shifted up and down, as best illustrated in FIGS. 4, 5, and 6.

Referring to these figures, and assuming that a walking structure initially has the position shown in FIG. 4, on the pipe being rotated on its axis 90°, or a quarter of a revolution, and in a clockwise direction, the center of journal portion 43 shifts from a position to the right of and horizontally aligned with the center of journal portion 44 (as in FIG. 4) to a position directly vertically below the center of journal portion 44. This position is illustrated in FIG. 5. Leg 30 has its bearing portion journaled on journal portion 43. Since this leg has its base on the ground in FIG. 4, the leg cannot move downwardly. Instead, leg 32 is moved upwardly, with such upward movement accompanied by shifting of leg 32 to the right. This change in the position of leg 32 is also apparent on comparing FIGS. 4 and 5. After the next 90° rotation of the pipe, the centers of the two journal portions are shifted into positions which again are in horizontal alignment. This time the center of journal portion 43 is to the left of the center of journal portion 44, as shown in FIG. 6. The two legs again both contact the ground, this time with leg 32 to the right of leg 30 (as shown in FIG. 6). As a result of such rotation, pipe 12 is shifted laterally a total distance equal to twice the offset of the journal portions. Upon the pipe being rotated another 180° from the position in FIG. 6, the parts return to the position shown in FIG. 2, with the pipe again traveling laterally a distance equal to twice the offset of the journal portions.

It will be noted that the total lateral movement of the conduit or pipe on one complete revolution of the pipe is considerably less than the movement that would have occurred with one revolution of the pipe had the pipe been supported in the hubs of wheels having radii equal to the lengths of legs 30, 32.

Because of the lesser lateral movement occurring in the pipe, the torques in the conduit that result when the same is turned are considerably less than would be the case were such wheels used to support the conduit. Further, it should be noted that the walking structures are smaller and can be made with considerably less mass than such wheels. As a corollary, the walking structures tend to be less expensive.

The legs of the various walking structures, after 180° and 360° rotation of the conduit, tend to come to rest with the bottoms of all the legs contacting the ground. Any leg that is slightly off the ground (because of any twisting that may have occurred in the pipe) is pulled down by gravity to a ground-contacting position, which has the effect of removing twist in the pipe. In moving the pipe to a new irrigating position, the conduit is always rotated a whole number of turns, and in its new position, because of the tendency noted above for any twist to be removed from the pipe, all nozzles in the system tend to fall into a mutually upwardly extending position.

As can be seen with reference to FIG. 6, if pipe 12 were rotated in the direction of the arrow shown another 90°, leg 30 which is journaled on concentric journal portion 43, would rise from the ground, and with the leg so would portions of conduit 12. This lifting of the conduit does not occur when the leg that is raised is the one mounted on an eccentric journal portion, such as leg 32 described. Were all the pipe raised at the same stage of its rotation throughout the entire length of the pipe, periodically high torques would result in the pipe (because of the force that necessarily must be applied to lift the pipe). In order to even out the torques resulting in the pipe when the same is rotated over 360°, the eccentric journal portions of the various walking structures are preferably mounted in a misaligned position, as generally indicated by the eccentric journal portions for three adjacent walking structures illustrated in FIG. 7. It will be seen with reference to FIG. 7, that as between two adjacent eccentric journal portions, such as the ones indicated at A and B, one is displaced 180° about the axis of the conduit from the other. With journal portions so mounted along the length of the pipe, during 360° rotation of the pipe, it is only alternating walking structures that lift the pipe from the ground at any one time, with every other walking structure lifting the pipe during one-half of the pipe's rotation, and the remaining structures lifting pipe during the remainder of the pipe's rotation.

In FIGS. 8 and 9, there is illustrated a modification of the invention. Here legs 65, 66 are shown extending down from journal portions 68, 70, similar to the journal portions 43, 44 just discussed. Journal portion 68 is concentric with pipe 12, and journal portion 70 occupies an eccentric position. As in the case of the first modification of the invention discussed, on rotation of conduit 12, upper ends of legs 65, 66 are moved relative to each other, up and down and from side to side. In this modification of the invention, the legs are interconnected intermediate their ends by a sliding sleeve assembly 72, including a sleeve portion 72a which is slidable up and down on leg 66, and a pivot pin portion 72b journaled in leg 65. The pivot pin accommodates swinging movement in sleeve portion 72a relative to leg 64, about an axis extending transversely of leg 64.

As in the case of the first embodiment, on rotation of the conduit the legs are moved up and down to advance the conduit over the ground. With the conduit rotated in a counter-clockwise direction in FIG. 8, over the first 90° of movement leg 66 is raised, and the bottom thereof moves up and to the right. On the next 90° of movement, the leg lowers. With the conduit rotated 180° farther, leg 65 moves up, shifts, and returns to the ground.

With this modification of the invention, total movement of the conduit during one complete revolution does not necessarily equal twice the offset of the eccentric journal portion, the movement resulting being also dependent upon the position of the sleeve assembly on the legs.

Referring to FIG. 10, and explaining another modification of the invention, here a ground-contacting bar or foot 80 is illustrated, which supports in an upright position leg or standard 84. Directly adjacent foot 80 is another bar or foot 82 which supports standard or leg 86. Upper portions of legs 84, 86 may be mounted on an irrigation conduit by mechanism, such as mechanism 36 already described, operable when actuated to produce up and down movement of the legs, coupled with relative lateral movement of the legs.

In this modification of the invention, the feet at the base of the legs are interconnected by a pair of crank members 88, with one crank member interconnecting each adjacent set of ends of the feet. The two crank members confine relative movement of the feet, whereby relative movement occurring in the feet, up and down and laterally, is the same as the relative movement produced in the tops of the legs connected to the feet.

It should be apparent from what has been described above that a novel ambulatory support means for an elevated irrigation system is contemplated, having a number of advantages over the usual construction where wheel-type support is provided. While several modifications of the invention have been described, obviously changes may be made in the parts and their organization, without departing from the invention. It is desired not to be limited to the specific disclosure herein, but to cover all such variations and modifications that would be apparent to one skilled in the art, and that come within the scope of the appended claims.

What is claimed is:

1. In an irrigation system including an elongated conduit for carrying irrigation water,
   ambulatory support means for said conduit mounting said conduit in a position elevated from the ground and actuatable to produce lateral movement of the conduit over the ground,
   said last-mentioned means comprising a pair of upright standards,
   means mounting upper portions of each of said standards on said conduit, and pivoted means pivotally interconnecting said standards limiting relative movement therebetween,
   said means mounting upper portions of said standards on said conduit including mechanism actuated by movement of the conduit to produce relative up-and-down movement of one standard with respect to the other coupled with relative movement of the bottoms of said standards in a direction extending laterally of the conduit.

2. An irrigation system with ambulatory support comprising,
   an elongated conduit for carrying irrigation water,
   a pair of upright standards,
   first and second mounting portions joined to said conduit and rotated by rotation of the conduit,
   said mounting portions having positions relatively offset from each other in a direction extending radially of the axis of said conduit,
   means journaling an upper portion of one of said standards on one of said mounting portions, means journaling an upper portion of the other of said standards on the other of said mounting portions, and pivoted means pivotally interconnecting said standards limiting relative movement therebetween.

3. An irrigation system with ambulatory support comprising, an elongated conduit for carrying irrigation water, a first journal portion joined to the conduit with the axis thereof coinciding with the axis of the conduit, a second journal portion joined to the conduit with the axis thereof offset with respect to the axis of said first journal portion and said conduit, a first upright standard extending downwardly from the base of said conduit including a bearing portion adjacent the upper end thereof journaled on said first journal portion, and a second upright standard extending downwardly from the base of said conduit including a bearing portion adjacent the upper end thereof journaled on said second journal portion, said journal portions producing up-and-down movement in said standards coupled with shifting of the standards laterally of the conduit by reason of the relative offset of their axes.

4. An irrigation system with ambulatory support comprising, an elongated conduit for carrying irrigation water, a first journal portion joined to the conduit with the axis thereof coinciding with the axis of the conduit, a second journal portion joined to the conduit with the axis thereof offset with respect to the axis of said first journal portion and said conduit, a first upright standard extending downwardly from the base of said conduit including a bearing portion adjacent the upper end thereof journaled on said first journal portion, a second upright standard extending downwardly from the base of said conduit including a bearing portion adjacent the upper end thereof journaled on said second journal portion, said journal portions producing up-and-down movement in said standards coupled with shifting of the standards laterally of the conduit by reason of the relative offset of their axes, and means interconnecting said standards positioned downwardly from the bearing portions thereof limiting relative movement of the bottom of said standards.

5. The irrigation system of claim 4, wherein the means interconnecting the standards downwardly from the bearing portions thereof comprises, a crank member with offset ends, said offset ends of the crank member being journaled in the two standards, one in each.

6. In an irrigation system, an elongated conduit for carrying irrigation water, and plural walking structures supporting said conduit at intervals along the length thereof and actuatable by movement of the conduit to produce lateral shifting in the conduit's position, each of said walking structures comprising first and second legs extending downwardly from the conduit, and means mounting said legs on said conduit including mechanism actuated by movement of the conduit to produce relative up-and-down movement of the legs with respect to each other coupled with relative movement of the base of the legs in a direction extending laterally of the conduit, and pivoted means pivotally interconnecting said legs limiting relative movement therebetween.

7. In an irrigation system, an elongated conduit for carrying irrigation water, and plural walking structures supporting said conduit at intervals along the length thereof and actuatable by rotation of the conduit to produce lateral shifting in the conduit's position, each of said walking structures comprising a first journal portion joined to the conduit with the axis thereof aligned with the conduit and with the conduit extending through the center thereof, a second journal portion joined to the conduit eccentrically disposed with respect to said conduit and one journal portion and with the conduit extending therethrough at a position offset from the center thereof, and first and second legs extending downwardly from the conduit, one of said legs including a bearing portion adjacent the upper end thereof journaled on said first journal portion, the other of said legs including a bearing portion adjacent the upper end thereof journaled on said second journal portion, said journal portions on rotation of the conduit producing up-and-down movement in said legs coupled with shifting of the legs laterally of the conduit by reason of the relative offset of their axes.

8. In an irrigation system, an elongated conduit for carrying irrigation water, and plural walking structures supporting said conduit at intervals along the length thereof and actuatable by rotation of the conduit to produce lateral shifting thereof over the ground, each of said walking structures comprising a first journal portion on the conduit with the axis thereof aligned with said conduit and with the conduit extending though the center thereof, a second journal portion on the conduit eccentrically disposed with respect to the conduit and having the conduit extending therethrough at a point offset from the center thereof, first and second legs extending downwardly from the base of the conduit, one of said legs including a bearing portion adjacent the upper end thereof journaled on one of said journal portions, and the other of said legs including a bearing portion adjacent the upper end thereof journaled on the other of said journal portions, and means interconnecting said legs at a point spaced downwardly from the conduit accommodating relative up-and-down and side-to-side movement therein but limiting the extent of such movement, said journal portions producing up-and-down movement and lateral movement in said legs upon rotation of the conduit by reason of the relative offset of the axes of the journal portions, said eccentrically disposed second journal portions for the various walking structures being out of alignment and displaced at different angular positions.

9. Support means for a pipe comprising, first and second journal portions joined to pipe and rotatable with the pipe, one of said journal portions being axially aligned with the pipe and being mounted with the pipe extending through the center thereof, the other of said journal portions being eccentrically disposed with respect to said pipe and being mounted with the pipe extending therethrough at a point offset from the center axis thereof, a pair of legs extending downwardly from the pipe and each including a bearing portion adjacent the top end thereof, said bearing portions of said legs being journaled on said journal portions and being subjected to relative up-and-down and side-to-side movement on rotation of said pipe and journal portions, such up-and-down and side-to-side movement in said bearing portions producing a corresponding movement in the remainder of said legs whereby the legs ambulate upon rotation of said pipe.

10. The support means of claim 9, which further includes means interconnecting said legs at a point below said pipe accommodating relative up-and-down and side-to-side movement of the base of the legs but limiting the extent of such movement.

11. An irrigation system with ambulatory support comprising:
an elongated conduit for carrying irrigation water,
a first journal portion on the conduit with the axis thereof coinciding with the axis of the conduit,
a second journal portion on the conduit with the axis axis thereof offset with respect to the axis of the first journal portion and said conduit,
a first upright standard extending downwardly from the base of the conduit including a bearing portion journaled on said first journal portion,
a second upright standard extending downwardly from the base of the conduit including a bearing portion journaled on said second journal portion,
said journal portions producing up-and-down movement in said standards coupled with shifting of the standards laterally of the conduit by reason of the relative offset of their axes, and
brace means extending between and interconnecting the conduit and said first upright standard.

12. In an irrigation system,
an elongated conduit for carrying irrigation water,
plural walking structures supporting said conduit at intervals along the length thereof and actuatable by rotation of the conduit to produce lateral shifting thereof over the ground, each of said walking structures comprising:
a first journal portion on the conduit with the axis thereof aligned with said conduit and with the conduit extending through the center thereof,
a second journal portion on the conduit eccentrically disposed with respect to the conduit and having the conduit extending therethrough at a point offset from the center thereof,
first and second legs extending downwardly from the base of the conduit,
one of the legs including a bearing portion adjacent the upper end thereof journaled on said first journal portions, and the other of said legs including a bearing portion adjacent the upper end thereof journaled on said second journal portions,
means interconnecting said legs at a point spaced downwardly from the conduit accommodating relative up-and-down and side-to-side movement therein but limiting the extent of such movement, and
brace means extending between and interconnecting the conduit and said one of said legs,
said journal portions producing up-and-down movement and lateral movement in the legs upon rotation of the conduit by reason of the relative offset of the axes of the journal portions.

13. In an irrigation system,
an elongated conduit for carrying water which is rotatable about its longitudinal axis,
a nozzle connected to the conduit and extending upwardly therefrom, and
ambulatory support means mounting the conduit in a position elevated from the ground and actuatable to produce lateral movement of the conduit, said ambulatory support means comprising,
first and second elongated feet members disposed side-by-side and in ground contact, and
means operatively interconnecting said feet members and actuated by rotation of the conduit whereby on 360° rotation of said conduit, and repositioning of the nozzle in a position extending upwardly from the conduit, the feet members are both placed in ground contact after raising, advancing and lowering of at least one of the feet members relative to the other.

14. In an irrigation system,
an elongated conduit for carrying water which is rotatable about its longitudinal axis,
plural nozzles distributed along the length of the conduit mounted on said conduit and projecting upwardly therefrom, and
plural walking structures supporting said conduit above the ground, said walking structures being interspersed with said nozzles along the length of the conduit,
each of said walking structures being actuatable by rotation of the conduit to produce lateral shifting of the conduit thereof over the ground, and comprising,
first and second elongated feet members disposed side-by-side extending transversely of the conduit and in ground contact, and
means operatively interconnecting said feet members and actuated by rotation of the conduit whereby on 360° rotation of the conduit, and repositioning of the nozzles in a position extending upwardly from the conduit, the feet members are both placed in ground contact after raising, advancing and lowering of at least one of the feet members relative to the other.

15. An ambulatory irrigation system, comprising:
an elongated conduit adapted to dispense water,
at least two ambulatory mechanisms in spaced apart relation connected by and supporting said conduit in elevated position relative the ground,
each ambulatory mechanism including a pair of upright ground-engaging pivotally interconnected supports to ambulate relative each other,
actuatable means between said supports to produce ambulatory movement of said supports, and
power means operable to simultaneously actuate the actuatable means of said ambulatory mechanisms to produce lateral movement of said conduit over the ground.

16. An ambulatory irrigation system, comprising:
an elongated conduit adapted to dispense water, at least two ambulatory mechanisms in spaced apart relation connected by and supporting said conduit in elevated position relative the ground,
each ambulatory mechanism including a pair of upright ground-engaging supports, said supports being pivotally interconnected by crank means providing spaced apart axes whereby each support may ambulate in a predefined path, established by and relative the position of the other, and
power means is included to activate the crank means of said ambulatory mechanisms.

References Cited by the Examiner

UNITED STATES PATENTS

| | | | |
|---|---|---|---|
| 461,441 | 10/1891 | Knollin | 180—8 |
| 2,892,593 | 6/1959 | Smeltzer | 180—8 X |
| 2,918,738 | 12/1959 | Barr | 180—8 X |

A. HARRY LEVY, *Primary Examiner.*

ARTHUR L. LA POINT, *Examiner.*